March 24, 1953.  H. A. KIRKPATRICK ET AL  2,632,807
WAVE GUIDE JOINT
Filed Sept. 18, 1945
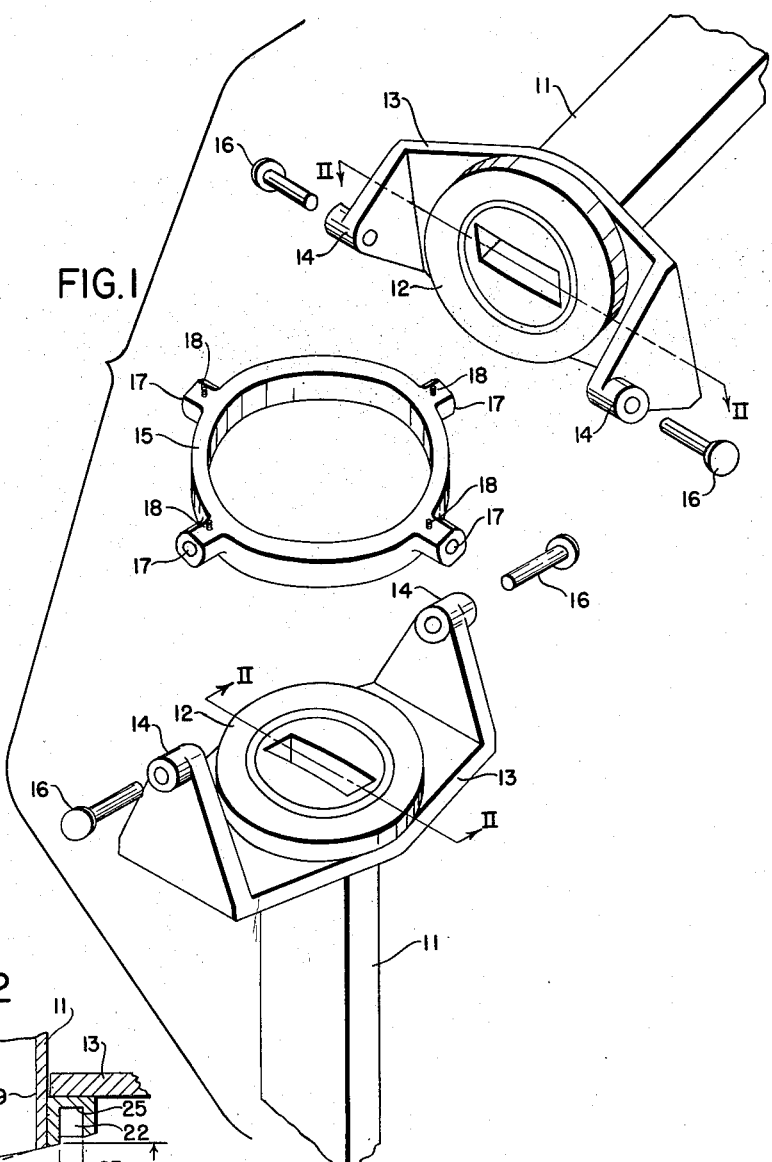
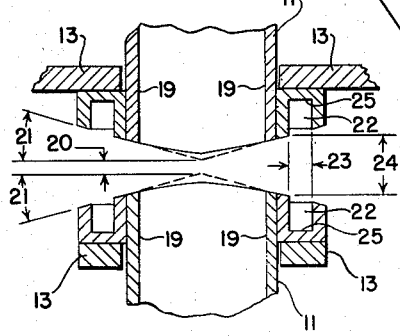
INVENTORS
HARRY A. KIRKPATRICK
EARL H. KROHN
BY
ATTORNEY Patented Mar. 24, 1953

2,632,807

UNITED STATES PATENT OFFICE 2,632,807

WAVE GUIDE JOINT

Harry A. Kirkpatrick, Cambridge, and Earl H. Krohn, Roxbury, Mass., assignors, by mesne assignments, to the United States of America as represented by the Secretary of the Navy Application September 18, 1945, Serial No. 617,150

7 Claims. (Cl. 178—44)

This invention relates to a joint for wave guides, and more particularly to a joint which permits the joined wave guides to wobble or nutate within fixed limits relative to one another.

One object of this invention is to provide a coupling means or joint for wave guides.

Another object is to provide a coupling means or joint for wave guides whereby a wide band or range of frequencies may be transmitted therethrough.

Another object is to provide a wave guide joint whereby the abutting ends of the wave guides may be displaced angularly one from the other without producing large voltage standing wave ratios and energy losses when these couplings are operated at a fixed frequency.

Still another object is to provide a wave guide joint whereby the abutting ends of the wave guide may be displaced angularly one from the other without producing large voltage standing wave ratios and energy losses when these couplings are operated over wide frequency ranges.

A further object is to provide such coupling means or joint which is simple in design, rugged mechanically, easily constructed at an economical cost, and highly efficient in the transfer of electromagnetic energy.

Other and further objects will appear in the course of the following description when taken with the accompanying drawings in which:

Fig. 1 shows an exploded view of one embodiment of this invention; and

Fig. 2 shows a longitudinal cross-sectional view of the embodiment of Fig. 1 in a plane determined by lines II—II on Fig. 1 when the joint is in perfect alignment, omitting the gimbal ring for the sake of simplicity.

In Fig. 1 two sections of wave guide 11 each have fastened to one end a modified conventional choke 12, preferably by soldering. To each combination of wave guide section and choke is secured, as by machine screws, a gimbal stand 13 of the shape shown with bearings 14. These bearings may be of the ordinary sleeve type, or, if the joint is to be used for rapid angular motion, suitable anti-friction bearings, such as ball bearings, may be inserted here. When wave guide sections 11 are perfectly aligned, gimbal stands 13 are mutually disposed 90° from one another. A gimbal ring 15 comprises the connecting linkage between the two units thus far described and is held in place by pins 16 inserted through bearings 14 into corresponding holes 17 in gimbal ring 15. These pins are further secured in place by means of set screws 18 as shown. As is obvious, pins 16 in bearings 14 constitute a rotatable joint.

In Fig. 2 are shown the two modifications to a conventional choke necessary to allow for angular displacements of the wave guide sections and to secure efficient operation of the choke over a broad band of frequencies. Since both halves of the wobble joint are similar, reference here is made only to the upper half, which is separated from the lower half by a gap as shown. Walls 19 of wave guide 11 extend through modified conventional choke 12 in the usual manner, and to this combination is attached gimbal stand 13.

The first modification is that the face of each choke 12 has been turned down as shown in a conical shape to allow the wave guide sections to be swung with respect to one another in any angular plane without decreasing their separation at any point to less than a certain fixed value which is the spacing between the apices of the projected sides of the turned down choke faces and indicated by dimension 20 on the drawing. Dimension 20 may be between 0.85 and 2.54 percent of the free space average electrical wave length of the electromagnetic energy being transferred. It has been found that approximately 12° is the maximum angular deviation from the aligned position allowable with this embodiment; greater angles result in greatly increased voltage standing wave ratios and energy losses. Hence, angle 21 of each cone face is fixed approximately 6°.

The second modification is that branch channel or annular groove 22 in each choke has been widened so that dimension 23 bears a definite ratio to the average effective separation of the abutting ends of the wave guides. By making this ratio approximately four or five to one, the impedance of branch channel 22 is made high with respect to the impedance of the gap or space separating the abutting ends of the wave guide, which constitutes a means well-known to those skilled in the art for broad-banding a transmission device, resulting in satisfactory operation over a wide range of frequencies. The average effective width of the gap or separation above-mentioned may be defined as the arithmetic means of dimension 20 and dimension 24, the latter being the dimension between the inner edges of branch channels 22 as shown.

As is well-known to those skilled in the art, terminating conducting wall 25 in each branch channel 22 constitutes a short circuit, and being disposed substantially an effective half wave length of the average electromagnetic energy being transferred from the gap between the abutting inside edges of wave guides 11, it reflects a short circuit at this gap, preventing the loss of energy from and high voltage standing wave ratios in the wave guide. The effective half wave length is measured from the centers of the broad walls of the wave guide 11 to the faces of the terminating conducting walls 25.

It is to be understood that while a gimbal ring has been shown as a means for permitting the wave guides to be swung in any angular plane relative to one another, any universal joint mechanism may be used for this purpose. Also, a plain flange may be used in place of one or the chokes 12. Further, while a particular embodiment of this invention has been described as required by the patent statutes, numerous additional applications of the above-disclosed principles will occur to those skilled in the art and no attempt has been made to exhaust such possibilities. The scope of the invention is defined in the following claims.

What is claimed is:

1. A wobble joint for the transfer of electromagnetic energy comprising, two wave guides having one end of each in adjacent relation, an electromagnetic energy choke secured to said end of each wave guide, said electromagnetic energy chokes having their faces addressed one to the other, and an external universal joint mechanism so fastened to each wave guide as to permit each wave guide to be swung in any angular plane relative to the other guide without blocking said transfer of electromagnetic energy.

2. A joint for wave guides for facilitating the transfer of electromagnetic energy across said joint, including means providing a gap between abutting ends of said wave guides at said joint, structures on the extremities of said wave guides in the neighborhood of said gap, substantially integral electrically with said wave guides and so shaped as to extend said gap for a distance of substantially an effective electrical quarter wave length from the center points of the mouth of said gap, said mouth being defined as the opening of said gap at the current-carrying surfaces of said wave guides, said wave guides each having a configuration providing also for a branch channel having a depth of substantially an electrical quarter wave length and communicating with said gap at a distance from said mouth of substantially an effective electrical quarter wave length, and a universal joint mechanism interconnecting said guides whereby each guide may be swung in any angular plane relative to the other guide.

3. A wobble joint for the transfer of electromagnetic energy comprising, two wave guides having one end of each in adjacent relation, an electromagnetic energy choke secured to said end of each wave guide, said electromagnetic energy chokes having their faces addressed one to the other, said faces being bevelled in a conical shape and so disposed that the separation of the apices of the projected surfaces of the cone faces is within the limits substantially 0.85 to 2.54 percent of the free space average electrical wave length of the electromagnetic energy being transferred, one from the other, said apex angles each being substantially one hundred eighty degrees less the greatest angle through which the joint is to be swung in any plane from the aligned position, a gimbal ring disposed adjacent to said chokes, means for securing one of said chokes to said gimbal ring by a rotatable joint at two points one hundred eighty degrees apart on the circumference of said gimbal ring, and means for securing the other of said chokes by a rotatable joint at two points one hundred eighty degrees apart and mutually ninety degrees from the first mentioned two points on the circumference of said gimbal ring, whereby each wave guide may be swung in any angular plane relative to the other guide.

4. A wobble joint for the transfer of electromagnetic energy comprising, two wave guides having one end of each in adjacent relation, an electromagnetic energy choke having conically bevelled faces secured to each of said adjacent ends, and means for retaining said chokes in juxtaposition with the bevelled faces addressing one another, whereby each wave guide may be swung in any angular plane relative to the other guide.

5. A wobble joint for the transfer of electromagnetic energy comprising, two wave guides having one end of each in adjacent relation, a conically bevelled electromagnetic energy choke secured to each of said adjacent ends, the bevelled faces of said chokes addressing one another, and a universal joint mechanism mechanically interconnecting said guides whereby each guide may be swung in any angular plane relative to the other guide.

6. A wobble joint for the transfer of electromagnetic energy, comprising a pair of wave guides disposed with one end of each in adjacent relationship, an electromagnetic energy choke attached to each of said adjacent ends, said chokes having the faces thereof conically bevelled and disposed such that the apices formed on said choke faces closely approach one another, a gimbal ring surrounding said joint adjacent said apices, a yoke on each of said adjacent wave guide ends, and means connecting said yokes to said gimbal ring at spaced points to form a universal joint between said wave guides, whereby one wave guide may be angularly displaced from the other.

7. A wobble joint for the transfer of electromagnetic energy, comprising a pair of wave guides disposed with one end of each in adjacent relationship, an electromagnetic energy choke attached to each of said adjacent ends, said chokes having the faces thereof conically bevelled and disposed such that the apices formed on said choke faces closely approach one another, a gimbal ring surrounding said joint adjacent said apices, four equally spaced abutments being arrayed around the periphery of said gimbal ring, a yoke attached to each of said wave guides at said adjacent ends, means for pivotally attaching said yokes to said abutments, said yokes being in perpendicular relationship one to the other, whereby one of said wave guides may be angularly displaced from the other.

HARRY A. KIRKPATRICK.
EARL H. KROHN.

REFERENCES CITED

The following references are of record in the file of this patent:

UNITED STATES PATENTS

| Number | Name | Date |
|---|---|---|
| 447,486 | Bennet et al. | Mar. 3, 1891 |
| 1,222,682 | Schreiber | Apr. 17, 1917 |
| 2,407,318 | Mieher | Sept. 10, 1946 |
| 2,473,724 | Okress | June 21, 1949 |
| 2,476,621 | Okress | July 19, 1949 |
| 2,484,822 | Gould | Oct. 18, 1949 |
| 2,521,818 | Aron | Sept. 12, 1950 |